(Specimens.)

B. B. WARD.
ORNAMENTED TUBE FOR DECORATING PURPOSES.

No. 305,987. Patented Sept. 30, 1884.

Attest:
John A. Ellis
J. A. Hurdle

Inventor:
Barton B. Ward
per J. A. Hurdle
Atty.

UNITED STATES PATENT OFFICE.

BARTON B. WARD, OF NEW YORK, N. Y.

ORNAMENTED TUBE FOR DECORATING PURPOSES.

SPECIFICATION forming part of Letters Patent No. 305,987, dated September 30, 1884.

Application filed January 12, 1884. (Specimens.)

*To all whom it may concern:*

Be it known that I, BARTON B. WARD, a citizen of the Dominion of Canada, and resident of New York, in the county of New York and State of New York, have invented certain new and useful Ornamented Tubes for Decorating Purposes, of which the following is a specification.

My invention relates to filling glass tubing with different materials in colors arranged so as to be artistic and attractive, and to paint the inner surface of a glass tube, as hereinafter described.

The object is to make a tube of glass with an inner tube having filling materials between and fastened together at their ends, so they can be slid over a metal pipe of a chandelier. It is also the object of the inner tube to make the space between the inner and the outer small, so as to economize when expensive materials are used for filling, and when the inner tube is painted on its outer surface with metallics or brocades which easily rub off the outside tube of glass will protect it and give the desired effect. In small tubes it is not necessary to have an inner tube, so by closing one end of the tube, then arranging the materials and closing the other end with some hard substance—such as plaster-of-paris or cork—the tube is finished and ready for use to decorate picture-frames and moldings. It is not necessary to have an inner tube or close the ends when a tube is painted on its inner surface; but it may be filled with any hardening substance to further secure the metallics or paints against peeling off.

Figure 1:
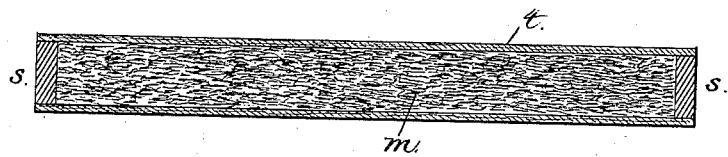

In the accompanying drawings, Figure 1 is a sectional elevation of a glass tube filled with loose materials and closed at the ends with some hard or hardening substance, such as plaster-of-paris and cork. *t* represents a glass tube; *m*, material with which it is filled; *s*, stoppers at the ends.

Figure 2:
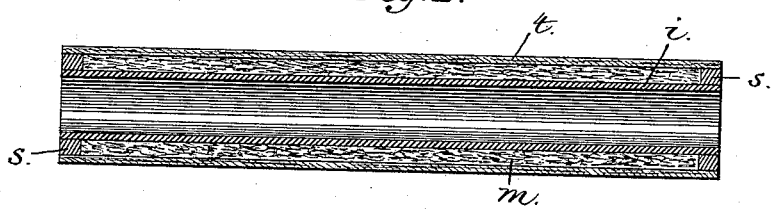

Fig. 2 is a sectional elevation of two tubes, one inside of the other with materials between, and closed at their ends by the stopping material, which rigidly secures the two tubes together. *t* represents glass or outside tube; *i*, inside tube, which may be of metal, wood, or glass. It may be painted on its outer surface with metallics or color paints, the outer tube protecting it from being scratched or marred; *m*, materials, and *s* stoppers.

Figure 3:
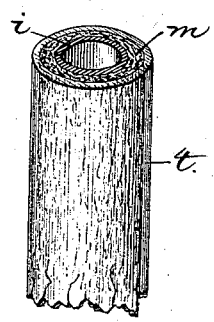

Fig. 3 is a view in perspective of a glass tube painted with metallics, brocades, or color paints on its inner surface, the metallics and brocades being put on by covering the inner surface with a colorless sizing or varnish. Then running a quantity of the metallics, brocades, or broken shells through the tube, a certain portion will adhere to the sizing and give the outside surface of the tube a smooth brilliant appearance, according to the shade of metallic or brocade used.

I am aware that single tubes of glass having their interior or outer surfaces covered with colors or metallic brocade, filings, &c., have heretofore been made; but I am not aware that a transparent tube provided with tube concentric therewith, and the space between the two filled with illuminated or colored materials, has ever before been used.

Having thus fully described my invention, what I claim, and desire to secure by Letters Patent, is—

In an ornamented tube for decorating purposes, the combination, consisting of a transparent tube inclosing a second tube concentric therewith, both arranged so as to form a space between them, the space filled with a loose metallic substance, a plug inserted in the space formed by the tubes adapted to hold the tubes together and keep the metallic substance in place, substantially as shown and described.

Signed at New York, in the county of New York and State of New York.

BARTON B. WARD.

Witnesses:
E. WM. EDWARDS,
J. A. HURDLE.